United States Patent
McCulloch

(10) Patent No.: US 6,337,017 B1
(45) Date of Patent: Jan. 8, 2002

(54) FLUID SEPARATOR

(76) Inventor: Philip A. McCulloch, 6307 Sea Isle, Galveston, TX (US) 77554

( * ) Notice: Subject to any disclaimer, the term of this patent is extended or adjusted under 35 U.S.C. 154(b) by 0 days.

(21) Appl. No.: 09/487,192

(22) Filed: Jan. 19, 2000

Related U.S. Application Data

(60) Provisional application No. 60/116,374, filed on Jan. 19, 1999.

(51) Int. Cl.⁷ ...................... B01D 17/038; B01D 17/028
(52) U.S. Cl. .................... 210/304; 210/512.1; 210/519; 210/521; 210/532.1
(58) Field of Search .............................. 210/304, 512.1, 210/519, 521, 532.1; 209/12.1, 734, 225

(56) References Cited

U.S. PATENT DOCUMENTS

| | | | | |
|---|---|---|---|---|
| 4,147,630 A | * | 4/1979 | Laval, Jr. | 210/512.1 |
| 4,564,443 A | * | 1/1986 | Bliss | 210/512.1 |
| 4,986,907 A | * | 1/1991 | Montemayor | |
| 5,685,974 A | * | 11/1997 | Fleming | |
| 5,819,955 A | * | 10/1998 | Clarke | |
| 5,858,252 A | * | 1/1999 | Darcey | 210/512.1 |

OTHER PUBLICATIONS

The RCI Diesel Fuel Purifier, Dec. 9, 1998.*

* cited by examiner

*Primary Examiner*—David A. Reifsnyder
(74) *Attorney, Agent, or Firm*—Baker & Daniels

(57) ABSTRACT

A fluid separator which includes an outer housing and a center fluid inlet tube which has a beveled lower end. Fluid enters the top of the housing into the inlet tube rotating as it passes downwardly through the tube and out the beveled end with the heavier particulate matter in the fluid settling to the bottom of the housing and the separated fluid being directed upwardly along the housing to the exterior of the inlet tube and out an outlet port in the housing.

7 Claims, 8 Drawing Sheets

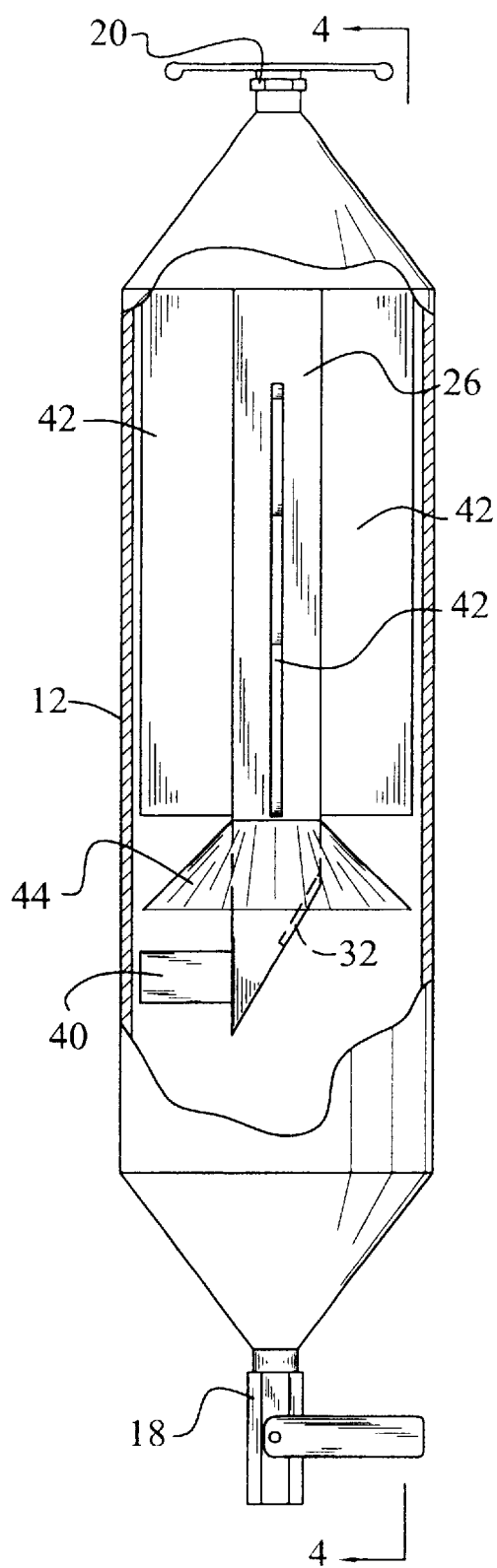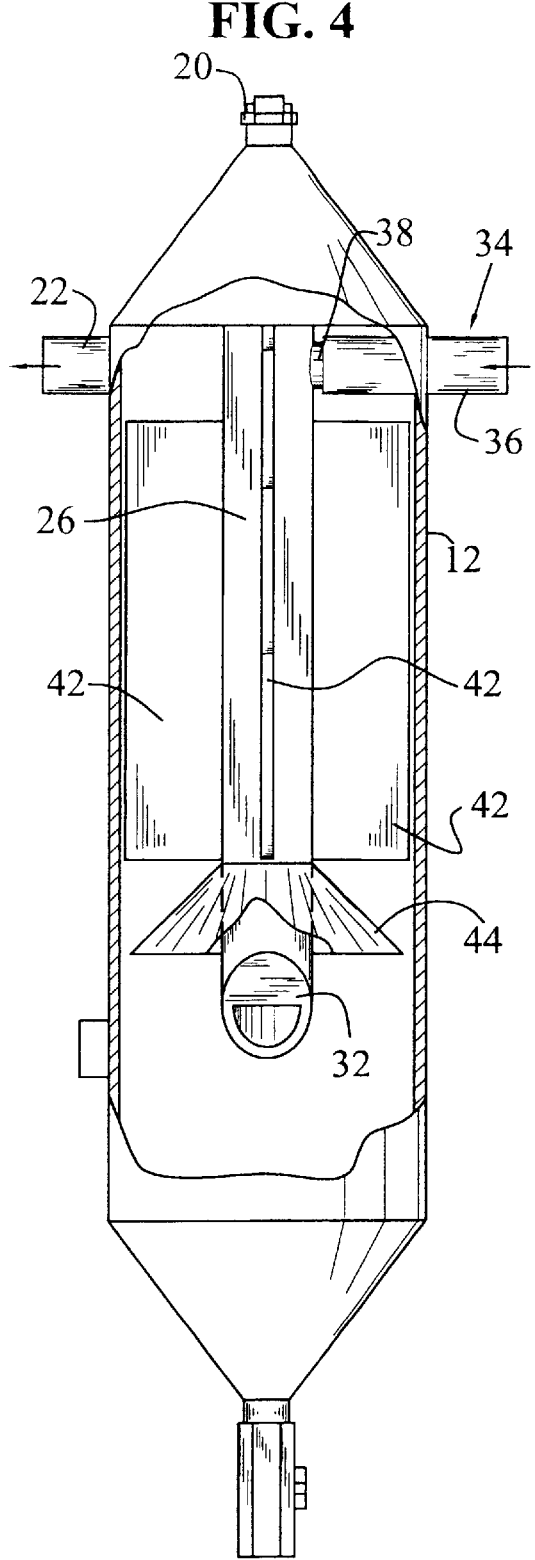

FLUID SEPARATOR

This application claims benefit of No. 60/116,374, filed Jan. 19, 1999.

BACKGROUND OF THE INVENTION

1. Field of the Invention

This invention relates to a fluid separator and will have specific but not limited application to a separator for fuel in which the impurities in the fuel may be separated out.

2. Discussion of the Prior Art

The existence of water and contaminant particles has been a long-standing problem in many industries, particularly in the fuel industry, such as diesel fuels, as the water and contaminant particles must be removed from the fluid prior to the engine chamber. Inadequate separation and filtration of such water and/or particles causes freezing of various fluid lines, as well as damage and costly repairs to the engine.

Many different types of separators have been suggested in the industry including such items as paper filters, baffle plates, and cyclonic action to remove the water and particles. One of the difficulties of the paper filters is the high cost and maintenance of the separators as well as the resultant down time.

With respect to a prior separator showing a plurality of baffle plates, U.S. Pat. No. 5,685,974 shows a plurality of baffle plates within a separator where the inlet port is projected into a spillway having a constricted opening at its end which opens into the separator cannister. Due to the geometry of this separator, the fluid cannot attain the speeds necessary to adequately separate the water and particulates.

Cyclonic separators, for example as shown in U.S. Pat. No. 5,819,955, vary in complexity and cost and are relatively complicated in design.

It is therefore an object of this invention to provide a fluid separator of simplified and reliable design. It is another object of this invention to provide a fuel purification apparatus in the form of a separator of economical construction. Other objects of this invention will become apparent upon a reading of the following description.

SUMMARY OF THE INVENTION

In this invention the fluid separator includes an outer housing and a centrally located, vertically oriented cylindrical tube which extends from adjacent the upper end to adjacent the lower end of the housing. The lower end of the tube has a beveled face which is partially obstructed by a plate which extends across the upper portion of the discharge opening of the tube as defined by the beveled tube lower end. There is a fluid inlet port into the tube at its upper end and a fluid outlet port from the housing at the housing's upper end.

Fluid, such as gasoline or diesel fuel, enters the separator from the inlet port and travels downwardly through the tube in a circular or spiraling motion which causes heavier impurities to be separated from the fluid. The fluid and separated impurities pass outwardly from the beveled lower end of the center tube under the obstructing plate or baffle with the impurities settling to the bottom of the separator housing and the fuel passing upwardly along the housing at the exterior of the central tube and out the outlet port at the upper end of the housing.

BRIEF DESCRIPTION OF THE DRAWINGS

FIG. 3 is an elevational view of the separator with a portion of the separator housing removed for purposes of illustration.

FIG. 4 is an elevational view of the separator as seen generally along line 4—4 of FIG. 3 and with portions of the separator removed for purposes of illustration.

DETAILED DESCRIPTION OF THE PREFERRED EMBODIMENT

Figure 1:
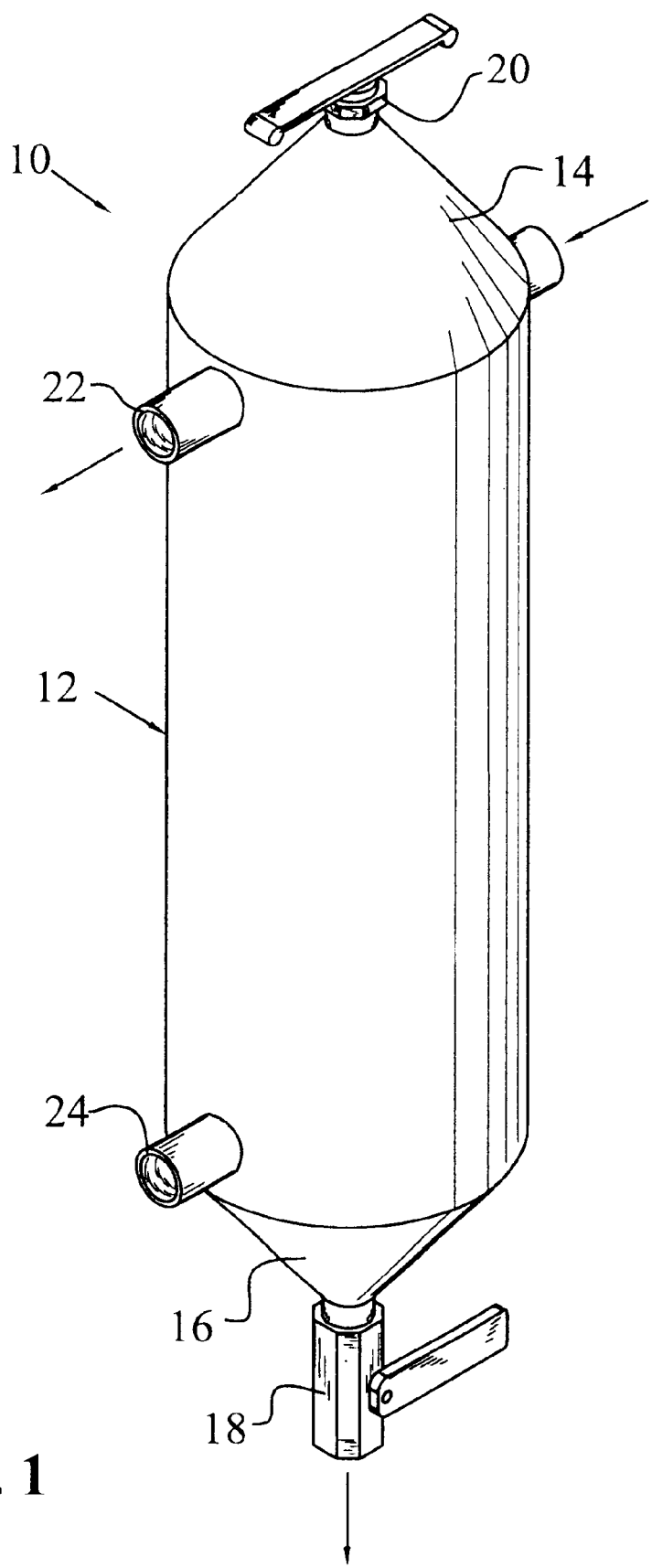
FIG. 1 is a perspective view of the separator of this invention.

Separator 10 of this invention includes an outer housing 12 which is cylindrically shaped having a conical shaped upper end 14 and a conically shaped lower end 16. At lower housing end 16 is an outlet valve 18. A vent valve 20 is preferably located at the upper end 14 of the housing. An outlet port 22 is located in the cylindrical side wall of housing 12 just adjacently below the conically shaped upper end 14. A sensor port 24 is located in the side wall of housing 12 slightly spaced above the conical lower end 16. Sensor port 24 is adapted to receive a sensor of the conductivity sensing type whose use will be later explained.

Mounted within housing 12 is a vertical flow tube 26 which extends from the lower level of upper end 14 along the general axis of the housing to a location slightly spaced above the level of sensor port 24. The upper end 28 of tube 26 is capped or closed while the lower end 30 of the tube is beveled. The angle of this bevel may vary between 45° and 55° relative to the vertical axis 27 of the tube and is preferably of a 48° angle. Lower end 30 of the tube is partially obstructed by a plate 32 which serves as a baffle and which covers approximately half of the beveled end.

Flow tube 26 is retained its vertical orientation within housing 12 by being connected to the inlet port 34 for the separator. Port 34 includes an outer sleeve part 36 which is threaded upon a tubular threaded nipple part 38 which is attached to and extends from the tube. Sleeve part 36 is welded or otherwise secured to housing 12. A brace part 40 is preferably attached between the inside wall of housing 12 and lower end 30 of tube 26 at an opposite location from the beveled face of the tube so as to provide stability to the tube, particularly in vibratory operational modes of the separator. Four equal angularly spaced fins 42 are attached to and extend longitudinally along tube 26. Fins 42 are utilized to provide flow paths for the separated fluid as it passes outwardly through outlet port 22.

A skirt 44 extends about tube 26 beginning slightly above the beveled lower end 30 of the tube and terminating at or, as seen, just slightly above the lower edge of the plate 32. Plate 32 serves as a deflector for the fluid passing downwardly through tube 26 while skirt 44 serves to regulate or suppress the separated fluid flow as it passes upwardly along fins 42.

Figure 2:
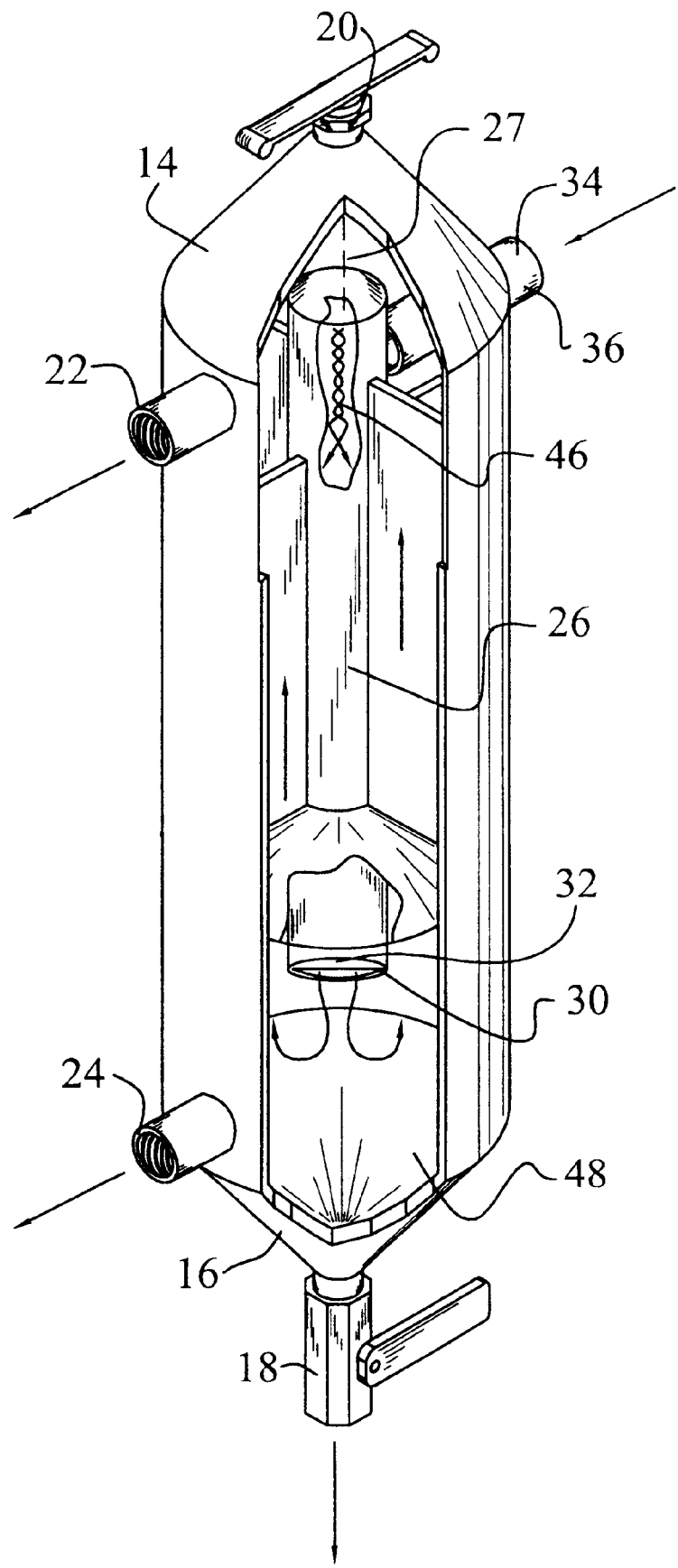
FIG. 2 is a perspective view like FIG. 1 but with portions of the separator removed for purposes of illustration to show the fluid flow through the separator.
Figure 5:
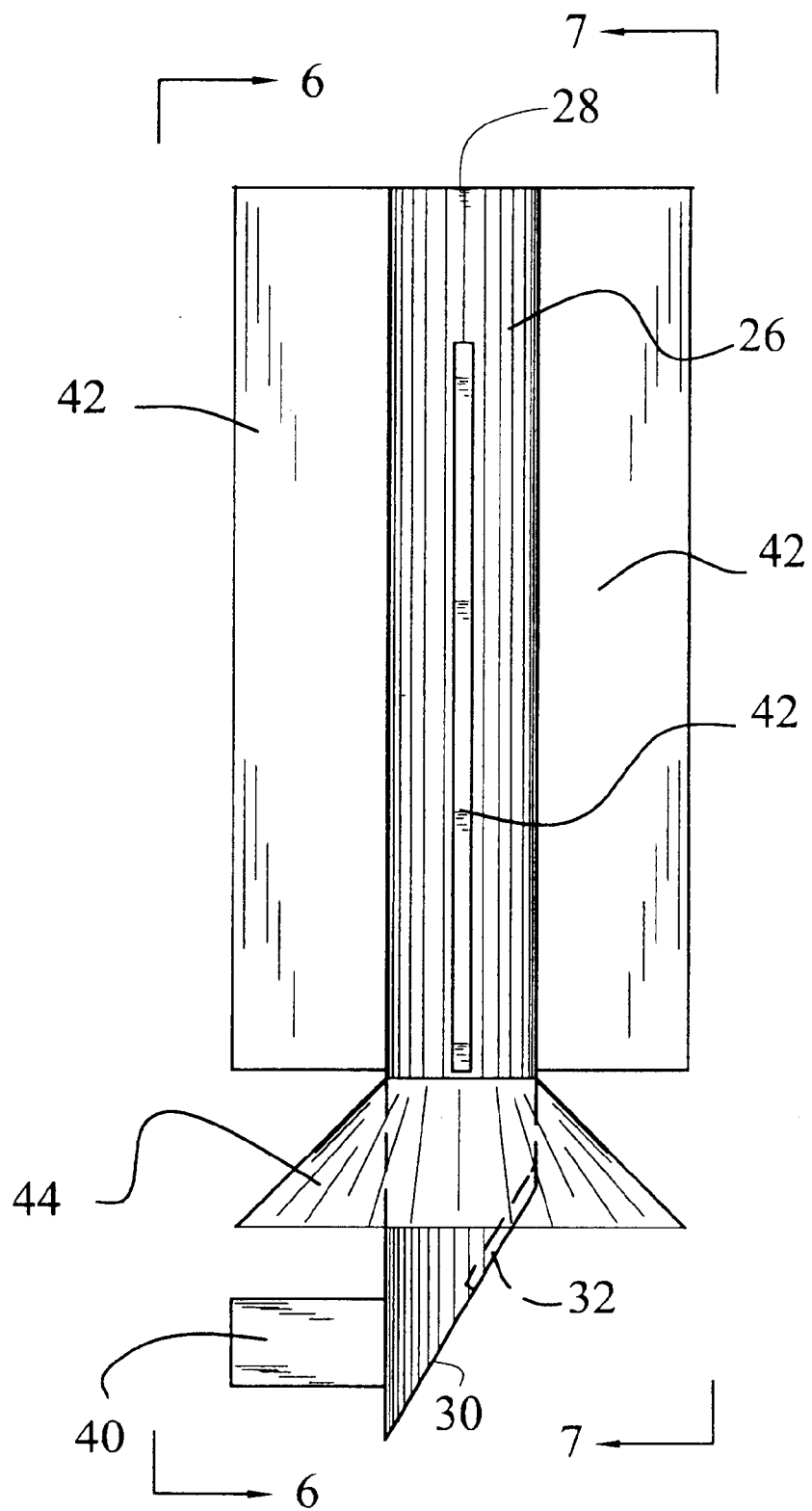
FIG. 5 is an elevational view of the internally located central tube and fins with a portion removed for purposes of illustration.
Figure 6:
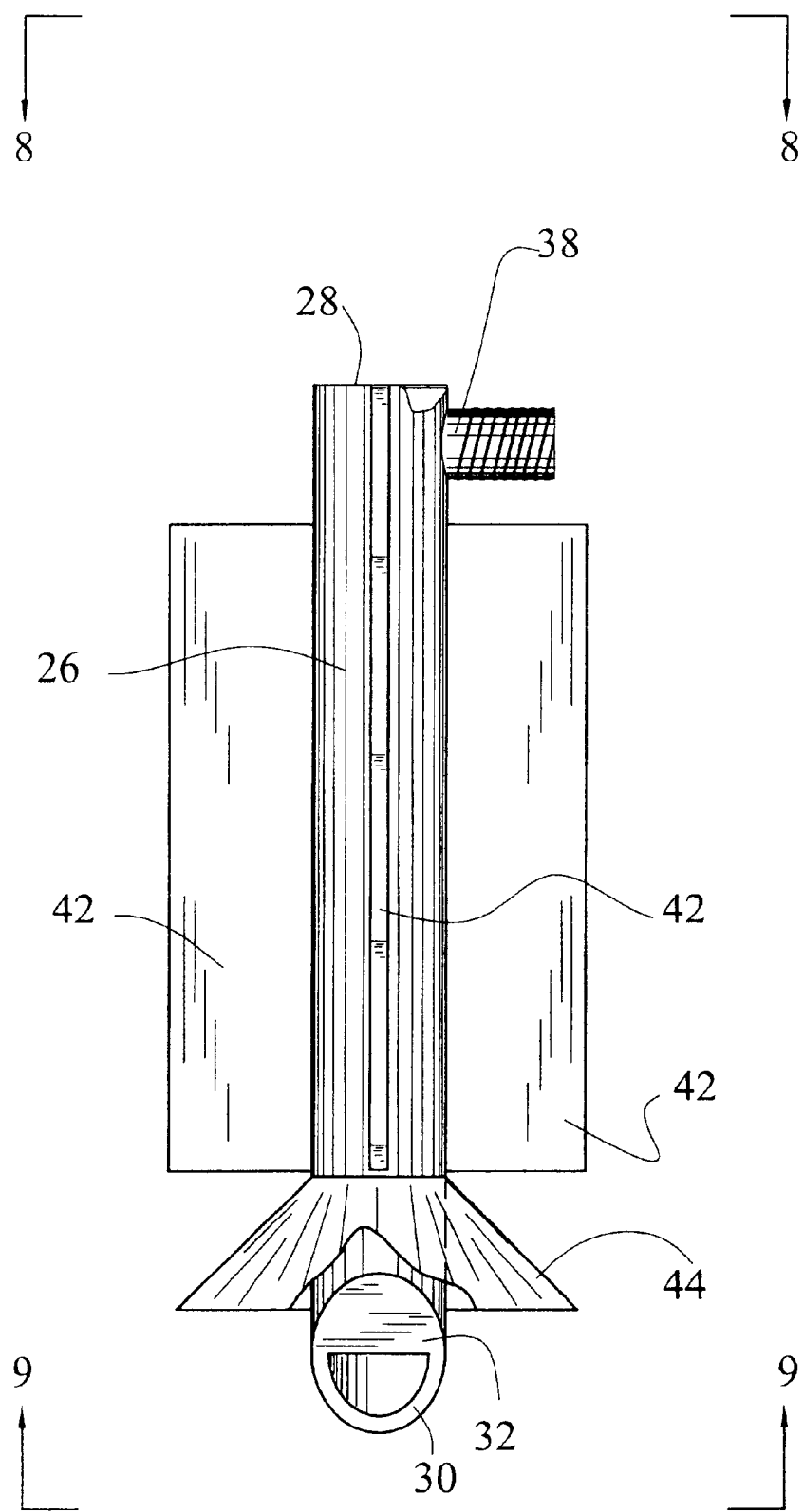
FIG. 6 is an elevational view as seen along line 6—6 of FIG. 5 and with portions removed for purposes of illustration.
Figure 7:
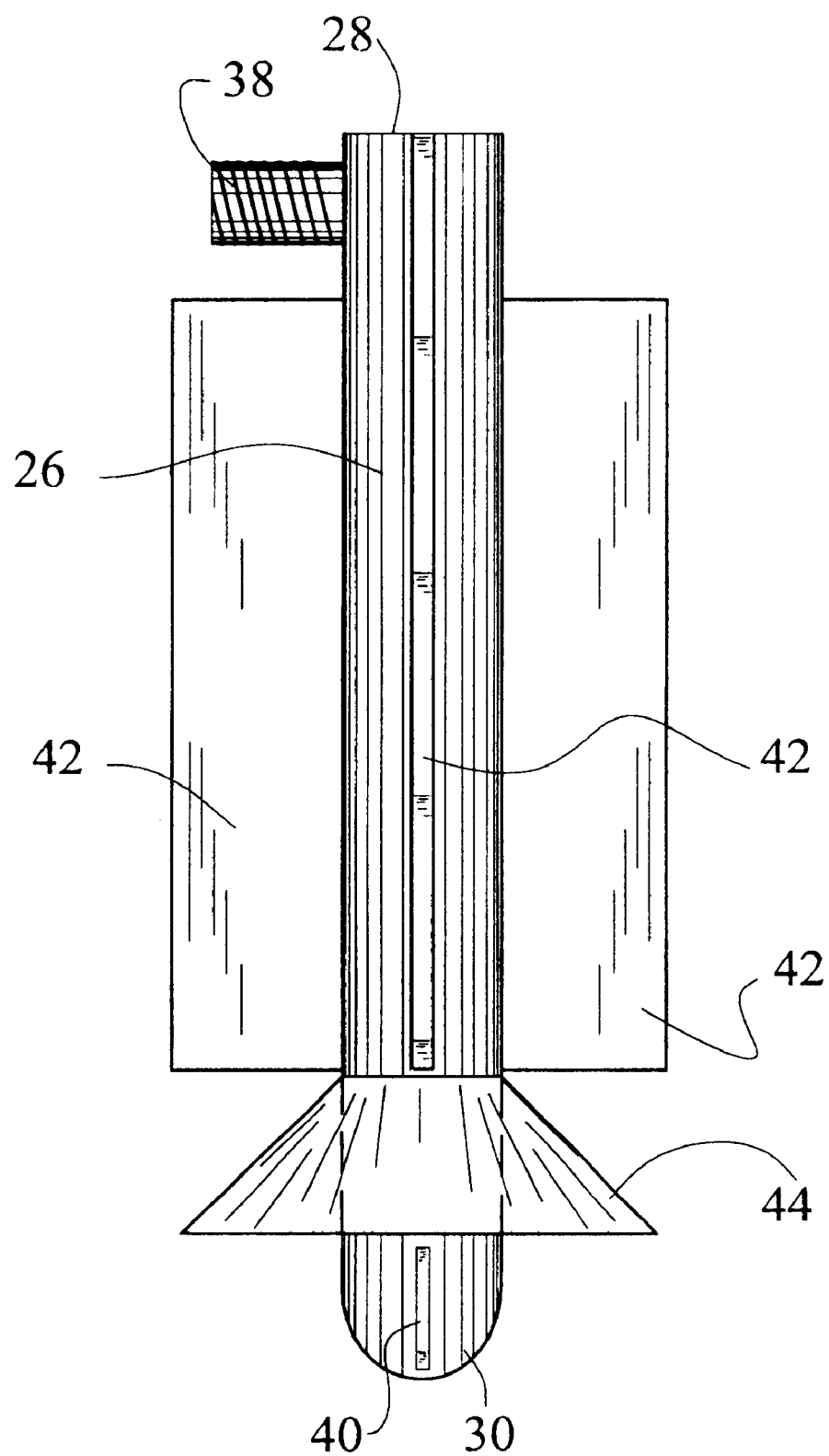
FIG. 7 is an elevational view as seen generally along line 7—7 of FIG. 5.
Figure 8:
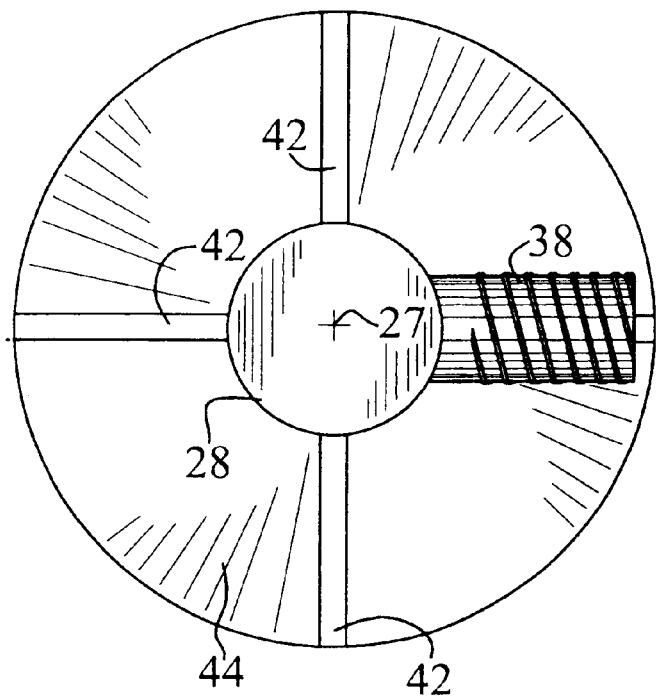
FIG. 8 is a top view as seen along line 8—8 of FIG. 6.
Figure 9:
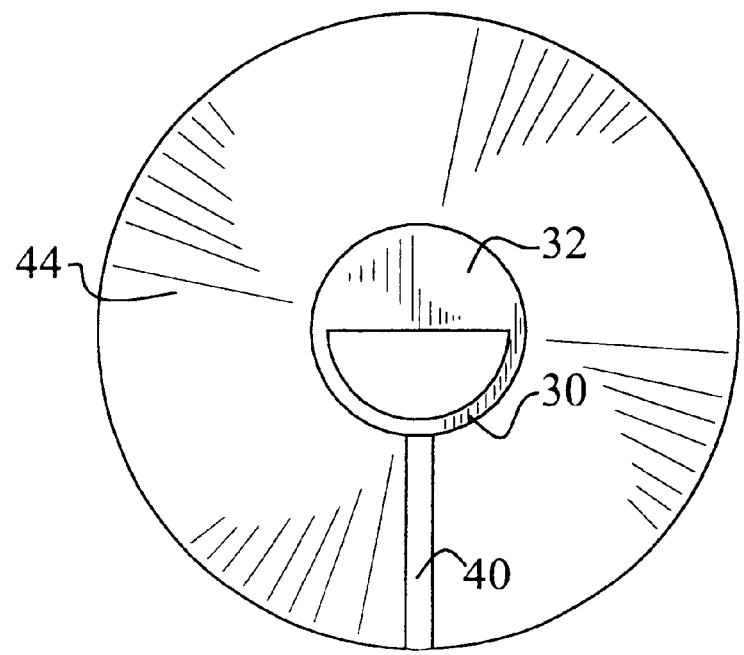
FIG. 9 is a bottom view as seen along line 9—9 of FIG. 6.

In operation, separator 10 functions as follows. Fluid such as diesel or gasoline fuel with impurities enters inlet port 34 where the fuel passes downwardly through flow tube 26. This downward flow of the fluid tends to be of a rotating motion as illustrated by arrow 46 in FIG. 2. As the fluid rotates within tube 26 the solid or heavier particulates or impurities are separated from the main fluid body. The fluid and now separated solid or particulate matter passes outwardly from the lower end 30 of the tube about plate 32 which acts as a deflector causing further separation of the particulate matter from the fluid body. The separated particulate matter 48 collects at the bottom of housing 12 in its lower end 16 while the separated fluid passes upwardly around skirt 44 and along the exterior of tube 26 between the fins 42 to outlet port 22. Sensor 24 measures the conductivity of the fluid which is affected by the impurities collected within lower end 16 of the housing. When the contaminant reaches a specific level, indicating that a certain amount of particulate or impurity matter has been collected in the lower end of housing 12, outlet valve is opened to discharge the impurities. Vent valve 20 at the upper end 14 of housing 12 may be opened periodically to vent any gaseous matter such as oxygen which is collected within the separator.

Figure 10:
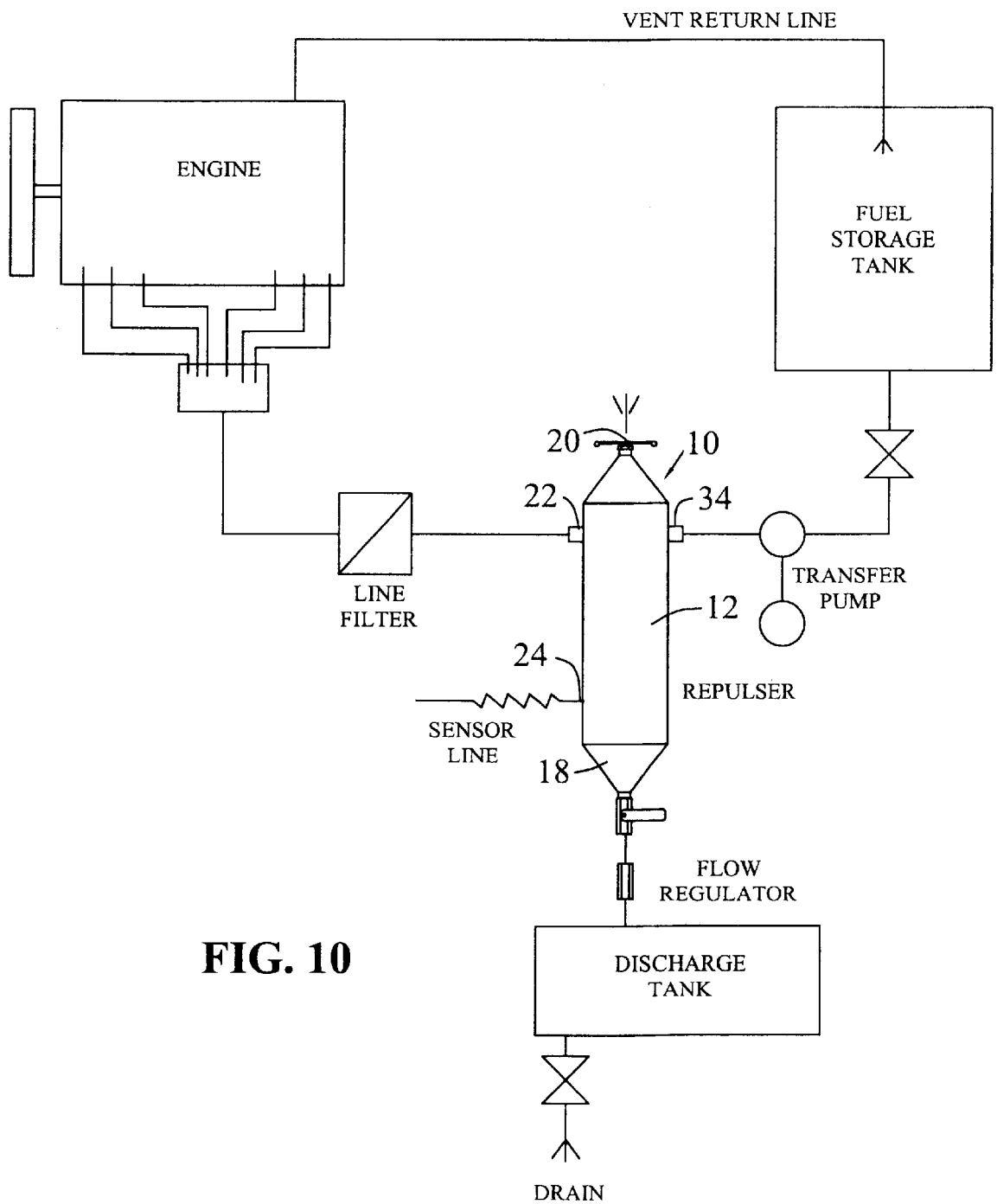
FIG. 10 is a schematic view of the filter used in the fuel system for an engine.

In FIG. 10 separator 10 is shown installed within the fuel system of an engine. Fuel is drawn from the storage tank and is introduced into separator 10 through port 34. The separated fuel then passes from the outlet port 22 of the separator through a line to an engine manufacturer supplied filter and then into the engine. Separated particulate matter is withdrawn through outlet valve 18.

The preferred embodiment illustrated is not intended to be exhaustive or to limit the invention to the precise form disclosed. It is chosen and described in order to best explain the principles of the invention so as to enable others skilled in the art to best utilize the invention. The invention is not to be limited to the details above given but may be modified within the scope of the appended claims.

What is claimed is:

1. A fluid separator comprising an outer housing having upper and lower ends, a cylindrical tube located in said housing and extending from adjacent said upper end to adjacent said lower end of the housing, said tube including upper and lower ends and having a vertical orientation when said separator is in use, said lower end of said tube having a beveled face partially obstructed by a plate extending across a portion of a discharge opening of said tube defined by said beveled tube face, a fluid inlet port into said tube at said upper end of said tube, a fluid outlet port from said housing at said upper end of said housing, said plate forming baffle means as said fluid exits said lower end of said tube.

2. The separator of claim 1 and a conical skirt about said tube adjacent said beveled tube face, said skirt spaced from said housing.

3. The separator of claim 2 wherein said skirt in extending from said tube terminates at a level above said lower end of said tube.

4. The separator of claim 2 wherein said beveled tube face extends between 45° and 55° relative to a central longitudinal axis of said tube.

5. The separator of claim 2 wherein said outlet port is adjacent said upper end of said housing.

6. The separator of claim 1 wherein said tube constitutes means for promoting rotational movement of the fluid as it passes downwardly through said tube from said inlet port to said tube discharge opening causing the separation of heavier matter in said fluid from the rest of the fluid.

7. The separator of claim 1 wherein said plate extends across an upper portion of said discharge opening.

\* \* \* \* \*